Dec. 18, 1928.
H. RICHTER
1,695,859
SLIP RING ASSEMBLY WITH SHORT CIRCUITING CONTACT
Filed Oct. 1, 1926
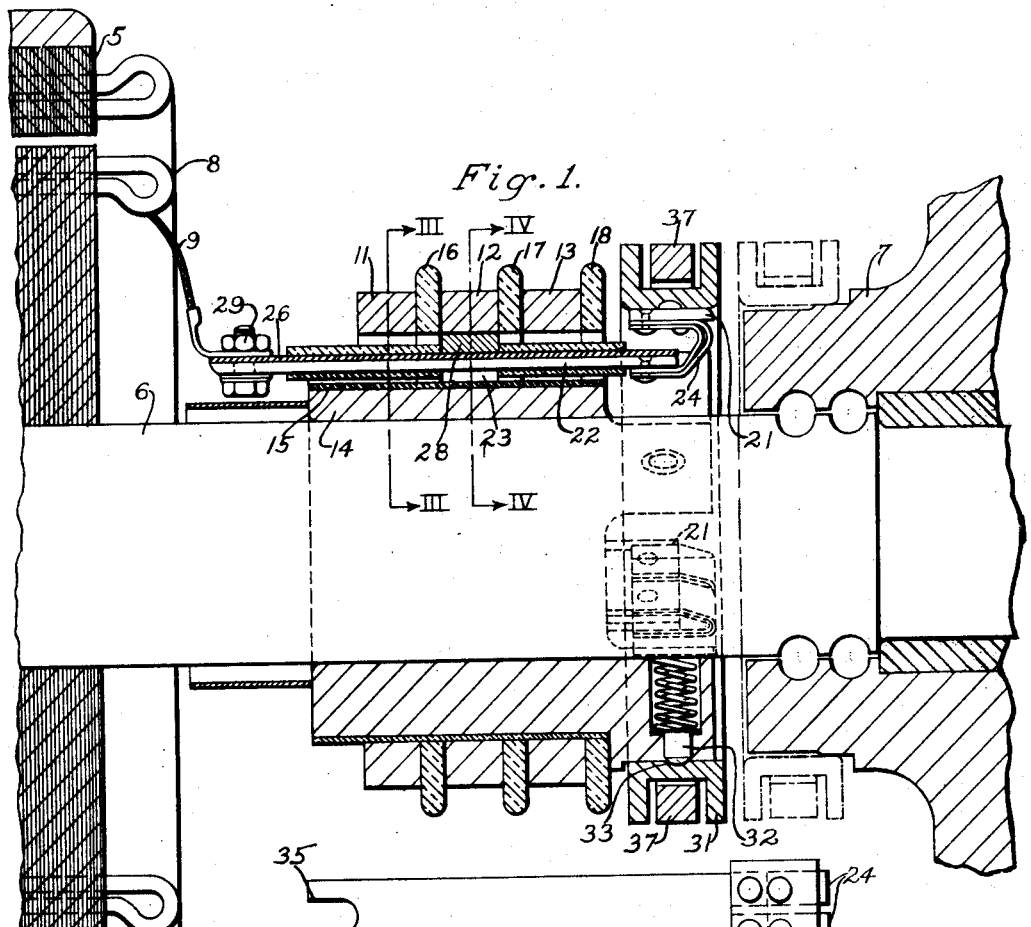
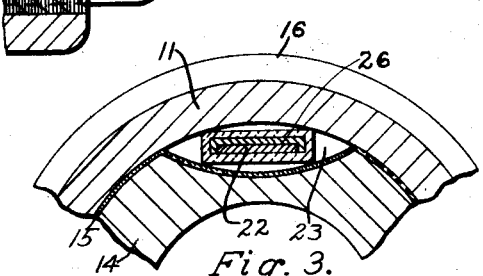
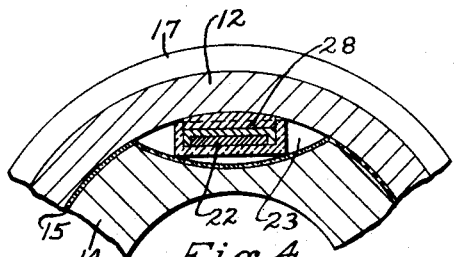
WITNESSES:
R. S. Williams
O. B. Buchanan
INVENTOR
Hans Richter
BY
Wesley K. Carr
ATTORNEY Patented Dec. 18, 1928.

1,695,859

UNITED STATES PATENT OFFICE.

HANS RICHTER, OF BEHRINGERSDORF, NEAR NUREMBERG, GERMANY, ASSIGNOR TO WESTINGHOUSE ELECTRIC & MANUFACTURING COMPANY, A CORPORATION OF PENNSYLVANIA.

SLIP-RING ASSEMBLY WITH SHORT-CIRCUITING CONTACT.

Application filed October 1, 1926, Serial No. 138,911, and in Germany October 8, 1925.

My invention relates to induction motors and the like, and it has special relation to means for short-circuiting the slip rings of such motors.

An object of my invention is to provide short-circuiting contact members of novel form for the slip rings of the secondary winding of an induction motor.

Another object of my invention is to provide a device which permits the exchange of a burnt contact member without disassembling the device, even in those cases in which a disengageable connection between the contact member and its associated conductor can not be used because of lack of room.

My present device distinguishes from prior short-circuiting devices in having conductors which are led through the slip-ring supporting member to the short-circuit contact members, each of said conductors having a short-circuiting contact member at one end and being connected at the other end to the conductor from a slip-ring by means of a disengageable connection, preferably a screw connection, which also engages a lead from the secondary winding of the motor.

With the foregoing and other objects in view, my invention consists in the details and combinations described and claimed in this specification, and illustrated in the accompanying drawing, wherein Fig. 1 is a fragmentary longitudinal sectional view of the slip-ring end of an induction motor embodying my invention.

Fig. 2 is a detail view of one of the special conductors of my invention, and

Figs. 3 and 4 are detail sectional views on the lines III—III and IV—IV, respectively, of Fig. 1.

As shown in Fig. 1, my invention is applied to an induction motor comprising a stator member 5 and a rotor member 6, the stator member being provided with bearings 7 for supporting the rotor member. The rotor member comprises secondary windings 8 which are provided with a plurality of terminal leads 9.

A plurality of slip-rings 11, 12 and 13 are provided at one end of the rotor member 6, the said slip-rings being mounted upon a supporting member 14 adjacent to one of the bearings 7. The supporting member 14 is provided with a layer 15 of insulation mounted thereon under the slip-rings 11, 12 and 13, and the slip-rings are further insulated by insulating rings 16, 17 and 18, adjacent thereto.

A plurality of contact members 21 are disposed at the end of the supporting member nearest the adjacent bearing 7. The contact members 21 are carried by conducting leads 22 projecting through suitable grooves or recesses 23 in the supporting member 14. A spring member 24 is provided between each of the contact members 21 and its conducting lead 22.

The several slip-rings 11, 12 and 13 are provided with leads 26 extending through the same grooves 23 as are occupied by the conducting leads 22 of the short-circuiting contact members. Each of the leads 26 is soldered or otherwise secured to one of the slip-rings, as indicated at 28 in Fig. 4, the lead being insulated from the remaining slip-rings, as indicated in Fig. 3.

Preferably, also, the several conducting leads 26 of the slip-rings and the respective conducting leads 22 of the contact members are nested in pairs, the one within the other, the outer lead of each pair being of channel section to receive the nested lead, as indicated in Figs. 3 and 4. By this arrangement, if the short-circuiting members are not desired, they can be simply removed without necessitating any change whatsoever in the conducting leads 26 of the slip-rings.

The conducting leads 22 and 26 terminate at the side of the supporting member 14 furthest from the adjacent bearing 7 and are detachably connected together in pairs and to the corresponding leads 9 of the rotor member by means of suitable removable connecting means illustrated in the form of bolts 29.

The short-circuiting contact members 21 are adapted to be engaged by an axially movable short-circuiting ring 31, said short-circuiting ring being disposed over a portion of the adjacent bearing 7 in its open-circuit position. Preferably, also, I provide spring-pressed detents 32, mounted in the supporting member 14, for engaging depressions 33 in the short-circuiting ring 31, for the purpose of holding the same against accidental displacement while it is in short-circuiting position surrounding the contact members 21.

By virtue of the construction hereinabove described, it will be noted that if one of the contact members 21 becomes burnt, the adjacent bearing 7 is first removed, the bolt 29 is loosened, and the damaged contact member, together with its conducting lead 22, is removed by withdrawing the same axially from the slip-ring assembly, the end of the lead 22 being forked, as indicated at 35, so that it may be readily removed from the bolt 29. New parts are then easily placed in position and the machine is again ready for service.

Another very desirable feature of my construction is that a minimum amount of axial space is consumed by my short-circuiting attachment, as the short-circuiting ring 31 is also the ring for the fork member 37 which actuates the same, the ring 31 being channel-sectioned for this purpose, and the ring rests over the bearing housing when it is in the open position.

I claim as my invention:

1. An electric machine having a plurality of slip-rings, a supporting member therefor, conducting leads for the several slip-rings, all extending to one side of the supporting member, short-circuiting contact members disposed at the other side of the supporting member, conducting leads for the several contact members, said last-mentioned conducting leads projecting through the supporting member to the first-mentioned side thereof, and means for removably connecting the slip-ring leads to the respective contact leads at said first-mentioned side of the supporting member.

2. A dynamo-electric machine comprising a stator member and a rotor member, the stator member comprising bearings for supporting the rotor member, the rotor member comprising a plurality of slip-rings, mounted at one end thereof, a supporting member for said slip-rings, conducting leads for the several slip-rings all extending to the side of said supporting member furthest from the adjacent bearing, short-circuiting contact members disposed at the side of the side of said supporting member nearest to said adjacent bearing, conducting leads for the several contact members, said last-mentioned conducting leads projecting through the supporting member to the first-mentioned side thereof, means for removably connecting the slip-ring leads to the respective contact leads at said first-mentioned side of the supporting member, and an axially movable short-circuiting ring for engaging said contact members, said short-circuiting ring being disposed over a portion of said adjacent bearing in its open-circuit position.

3. An electric machine having a plurality of slip-rings, a supporting member therefor, conducting leads for the several slip-rings all extending to one side of the supporting member, short-circuiting contact members disposed at the other side of the supporting member, conducting leads for the several contact members, said last-mentioned conducting leads projecting through the supporting member to the first-mentioned side thereof, the several connecting leads of the slip-rings and the respective connecting leads of the contact members being nested in pairs, the one within the other, the outer lead of each pair being of channel section to receive the nested lead, and means for removably connecting the slip-ring leads to the respective contact leads at said first-mentioned side of the supporting member.

In testimony whereof, I have hereunto subscribed my name at Nuremberg this 8th day of September, 1926.

HANS RICHTER.